United States Patent
Goyal et al.

(10) Patent No.: US 12,439,282 B2
(45) Date of Patent: Oct. 7, 2025

(54) PROVIDING CONTINUOUS SERVICE IN WIRELESS COMMUNICATION NETWORK

(71) Applicants: RAKUTEN MOBILE, INC., Tokyo (JP); Rakuten Symphony, Inc., Tokyo (JP)

(72) Inventors: Rajesh Kumar Goyal, Indore (IN); Vinay Vij, Tokyo (IN); Ranjeet Kumar Patro, Indore (IN); Satish Babu Sura, Indore (IN); Mudit Goel, Indore (IN); Shashank Misra, Indore (IN)

(73) Assignees: RAKUTEN SYMPHONY, INC., Tokyo (JP); RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/024,388

(22) PCT Filed: Feb. 2, 2023

(86) PCT No.: PCT/US2023/012175
§ 371 (c)(1),
(2) Date: Mar. 2, 2023

(87) PCT Pub. No.: WO2024/136909
PCT Pub. Date: Jun. 27, 2024

(65) Prior Publication Data
US 2024/0292241 A1 Aug. 29, 2024

(30) Foreign Application Priority Data
Dec. 22, 2022 (IN) .............................. 202221074615

(51) Int. Cl.
*H04W 24/04* (2009.01)
(52) U.S. Cl.
CPC .................................. *H04W 24/04* (2013.01)

(58) Field of Classification Search
CPC .... H04W 24/04; H04W 76/19; H04W 88/085
See application file for complete search history.

(56) References Cited

U.S. PATENT DOCUMENTS

| 2019/0069333 A1* | 2/2019 | Kim ................... H04W 36/0033 |
| 2019/0215756 A1* | 7/2019 | Park .................... H04W 36/305 |

(Continued)

FOREIGN PATENT DOCUMENTS

| EP | 2 557 889 B1 | 7/2019 |
| JP | 2019-174896 A | 10/2019 |

OTHER PUBLICATIONS

Written Opinion dated May 16, 2023 issued in Application No. PCT/US23/12175.

(Continued)

*Primary Examiner* — Afshawn M Towfighi
(74) *Attorney, Agent, or Firm* — Sughrue Mion, PLLC

(57) ABSTRACT

Embodiments are directed to a system for providing continuous service in a wireless communication network. The system includes a communication management controller, a first DU connected to the communication management controller for communicating with a CU and a second DU. Traffic associated with the first DU is provided as input to an active port of the communication management controller and the first DU is configured to set an alarm signal to a control port of the communication management controller indicating an active status of the first DU. The communication management controller determines a failure of the first DU based on the alarm signal is not set and automatically switches the input from the active port to a default port of the communication management controller and provide continuous service in the wireless communication network by redirecting traffic associated with the first DU towards the second DU.

11 Claims, 6 Drawing Sheets

(56) References Cited

U.S. PATENT DOCUMENTS

| | | | |
|---|---|---|---|
| 2019/0245740 A1* | 8/2019 | Kachhla | H04W 88/12 |
| 2022/0095162 A1 | 3/2022 | Shimoda et al. | |
| 2025/0142652 A1* | 5/2025 | Van Phan | H04W 76/14 |

OTHER PUBLICATIONS

International Search Report dated May 16, 2023 in Application No. PCT/US23/12175.

* cited by examiner

PROVIDING CONTINUOUS SERVICE IN WIRELESS COMMUNICATION NETWORK

CROSS-REFERENCE TO RELATED APPLICATION

This application is a National Stage of International Application No. PCT/US2023/012175 filed Feb. 2, 2023, claiming priority based on Indian Provisional Application No. 202221074615, filed on Dec. 22, 2022, the disclosure of which is incorporated herein by reference in its entirety.

FIELD OF INVENTION

The present disclosure relates to wireless communication, and more specifically related to a system and method for providing continuous service in a wireless communication network.

BACKGROUND

With advancement in telecommunication, there are a large number of subscribers connected to base stations (BS) for multiple types of service. A cell site of the BS includes plurality of equipment. In case any of the plurality of equipment at the cell site fails due to reasons such as but not limited to software failure, equipment failure, etc. then services provided by a telecom network to subscribers is impacted. Hence it becomes very important that the telecom network is resilient.

Conventionally, telecom resiliency systems include an active system which provides the telecom service to the multiple subscribers and a standby system which is used to switchover from the active system in case of failure of the active system. Therefore, the standby system acts as the active system and continues to provide the telecom service to the subscribers. However, the standby system lies idle all the while the active system is operating, leading to wastage of large amount of resources which can be utilized for enhancing quality of service (QoS) for the subscribers. Thus, it is desired to at least provide a mechanism that is devoid of the above issues.

OBJECT OF INVENTION

The principal object of the embodiments herein is to provide a system and method for providing continuous service in a wireless communication network by diverting traffic from a failed DU to another active DU based on an alarm signal. The diversion of the traffic is performed using a communication management controller having multiple ports. The proposed method ensures continued service by the DU due to any type of failure such as for example failure of lead DU, the lead DU misbehaves, failure of any port of the DU, traffic failure, power failure at one of the DU, even failure of passive optical switch which is used in the communication management controller. Therefore, unlike to the existing solutions in the proposed method the DU can overtake traffic from a failed DU under various conditions and provide continued service to subscribers.

SUMMARY

Accordingly, embodiments herein disclose a system for providing continuous service in a wireless communication network. The system includes a communication management controller including a plurality of ports, a first distributed unit (DU) of a plurality of DUs connected to the communication management controller for communicating with a centralized unit (CU) and a second DU of the plurality of DUs connected to the first DU. Traffic associated with the first DU is provided as input to an active port of the communication management controller and the first DU is configured to set an alarm signal to a control port of the communication management controller indicating an active status of the first DU. The communication management controller is configured to determine a failure of the first DU based on the alarm signal to the control port of the communication management controller is not set and automatically switch the input from the active port to a default port of the communication management controller. The default port is connected to the second DU. The communication management controller is configured to provide continuous service in the wireless communication network by redirecting traffic associated with the first DU towards the second DU.

In an embodiment, the first DU is a lead DU and the first DU is hosting LTE and mmWave, and the second DU is hosting Sub6 5G NR.

In an embodiment, the second DU forwards midhaul (MH) traffic to the first DU via one of a P-CL link and a S-CL link, and the first DU forwards the MH traffic to the CU through the communication management controller and wherein the traffic from the CU towards the second DU is routed by the first DU to the second DU on one of the P-CL link and the S-CL link.

In an embodiment, the second DU acts as a lead DU on switching of the input from the active port to the default port of the communication management controller.

In an embodiment, the second DU is further configured to determine a priority associated with each of the bands to be served by the second DU and determine whether a capacity associated with the second DU meets a DU capacity threshold. Further, the second DU is configured to perform one of limit a cell capacity of the second DU to serve the LTE, the mmWave and the Sub6 simultaneously, in response to determining that the capacity associated with the second DU does not meets the DU capacity threshold, and shutdown the Sub6 NR to serve at least one of the LTE on full capacity, in response to determining that the capacity associated with the second DU does meets the DU capacity threshold.

Accordingly, embodiments herein disclose a method for providing continuous service in a wireless communication network. The method includes determining, by a communication management controller, an alarm signal to a control port of the communication management controller is not set. The alarm signal to a control port of the communication management controller indicates an active status of a first distributed unit (DU) of a plurality of DUs. The method also includes determining, by the communication management controller, a failure of the first DU based on the alarm signal to the control port of the communication management controller is not set. Traffic associated with the first DU is provided as input to an active port of the communication management controller. The method also includes automatically switching, by the communication management controller, the input from the active port to a default port of the communication management controller connected to the second DU and providing, by the communication management controller, continuous service in the wireless communication network by redirecting traffic associated with the first DU towards the second DU.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
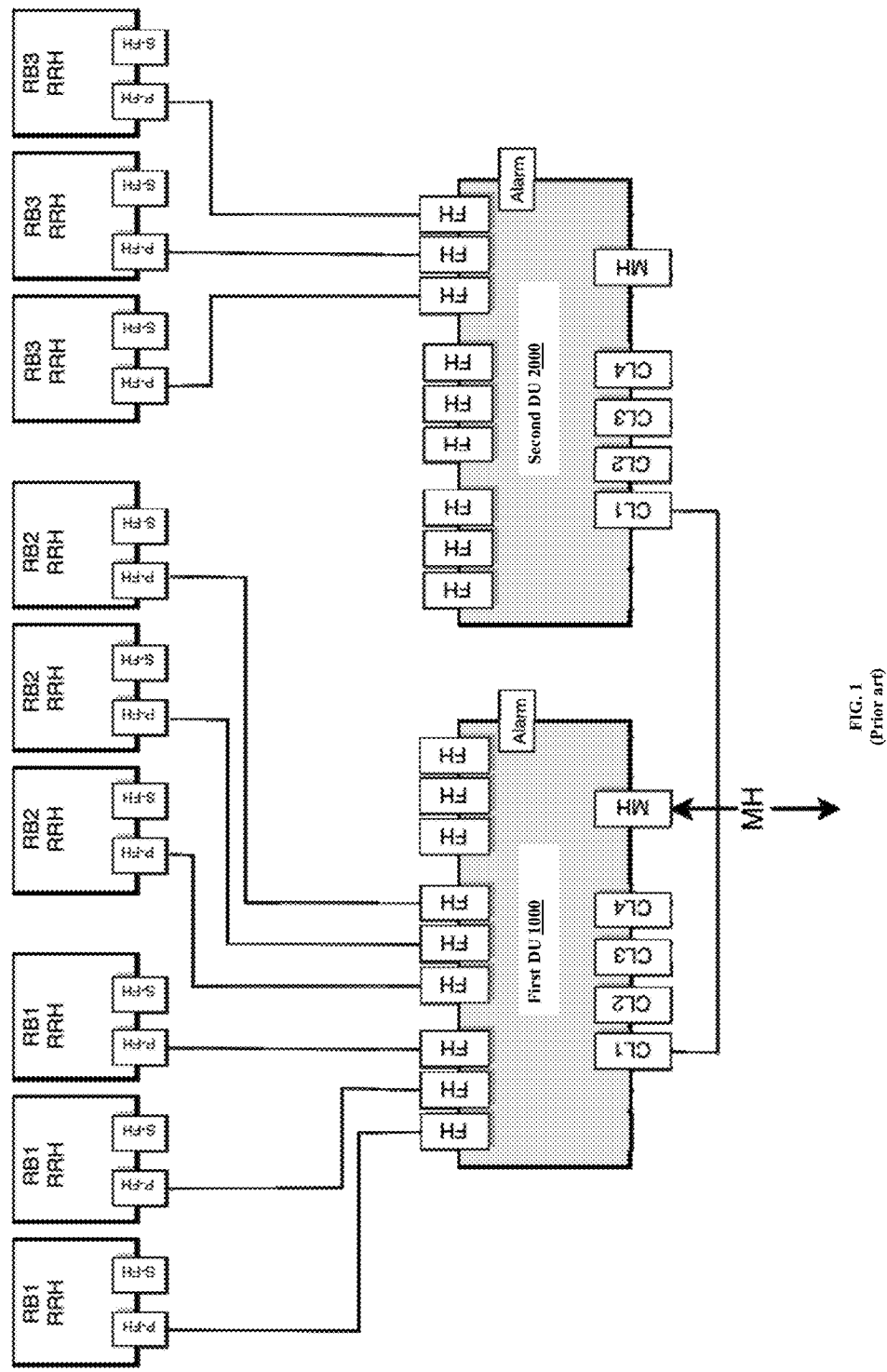
FIG. 1 illustrates a scenario of a cell site comprising two operating DUs, according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a system for providing continuous service in a wireless communication network. The system includes a communication management controller comprising a plurality of ports, a first distributed unit (DU) of a plurality of DUs connected to the communication management controller for communicating with a centralized unit (CU) and a second DU of the plurality of DUs connected to the first DU. Traffic associated with the first DU is provided as input to an active port of the communication management controller and the first DU is configured to set an alarm signal to a control port of the communication management controller indicating an active status of the first DU. The communication management controller is configured to determine a failure of the first DU based on the alarm signal to the control port of the communication management controller is not set and automatically switch the input from the active port to a default port of the communication management controller. The default port is connected to the second DU. The communication management controller is configured to provide continuous service in the wireless communication network by redirecting traffic associated with the first DU towards the second DU.

Accordingly, embodiments herein disclose a method for providing continuous service in a wireless communication network. The method includes determining, by a communication management controller, an alarm signal to a control port of the communication management controller is not set. The alarm signal to a control port of the communication management controller indicates an active status of a first distributed unit (DU) of a plurality of DUs. The method also includes determining, by the communication management controller, a failure of the first DU based on the alarm signal to the control port of the communication management controller is not set. Traffic associated with the first DU is provided as input to an active port of the communication management controller. The method also includes automatically switching, by the communication management controller, the input from the active port to a default port of the communication management controller connected to the second DU and providing, by the communication management controller, continuous service in the wireless communication network by redirecting traffic associated with the first DU towards the second DU.

Conventional methods and systems include electronic cross-connect to switch data flows between one or more digital units and one or more of remote radio units. However, there are no methods or systems to switch data flows during failure of DUs.

Unlike to the conventional methods and systems, the proposed method includes use of optical switch to switch data flow between a lead DU and other DUs in the cell site when the lead DU fails. The optical switch performs the diversion of the data flow based on an alarm signal.

Unlike to the conventional methods and systems, the proposed system is resilient to any form of failure/misbehaviour at the DU or at optical switch. When there is a failure misbehaviour detected at the DU the path of the traffic is automatically diverted to a default path which leads to another active DU. Even when there is failure of the optical switch the traffic from the midhaul is directly connected to the default Port to ensure that the service is not curtailed. Therefore, the proposed system involves the cascading of multiple DUs which makes the system resilient to any kind of failure.

Referring now to the drawings, and more particularly to FIGS. 1 through 4, where similar reference characters denote corresponding features consistently throughout the figures, there are shown preferred embodiments.

FIG. 1 illustrates a scenario of a cell site comprising two operating DUs, according to the prior art.

Referring to the FIG. 1, consider the cell site which includes a first DU (2000) and a second DU (3000). Here, the first DU (2000) hosts LTE and mmWave and the second DU (3000) hosts Sub6 5G NR.

The first DU (2000) is a lead DU and connects to MH towards a centralized unit (CU) (5000). The second DU (3000) forwards MH traffic to the first DU (2000) via P-CL link or S-CL link i.e., P-CL port of the first DU (2000) is connected to a P-CL port of the second DU (3000). The first DU (2000) forwards the traffic associated with the second DU (3000) to the CU (5000). Similarly, traffic from the CU (5000) which needs to be sent to the second DU (3000) is sent towards the second DU (3000) is routed by the first DU (2000) to the second DU (3000) on the P-CL link or the S-CL link.

Consider a scenario of failure of the MH port on the first DU (2000) or a failure of the first DU (2000), then all services at the cell site goes down. As a result, a user experience of the subscribers gets badly impacted. Conventional methods and systems, to address the above-mentioned problem includes providing a standby DU for the lead DU i.e., the first DU (2000). The standby DU is inoperative and becomes operative or activated only during the failure of the first DU (2000). As a result, the resources of the standby DU which could have been used to provide services to more users is wasted.

Figure 2:
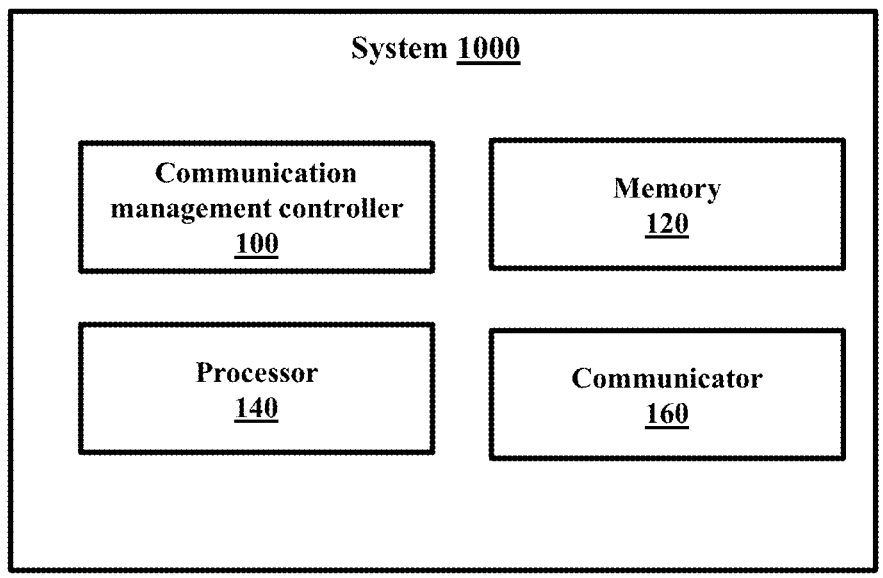
FIG. 2 is a block diagram of a system for providing continuous service in the wireless communication network, according to an embodiment as disclosed herein.

FIG. 2 is a block diagram of a system (1000) for providing continuous service in the wireless communication network, according to an embodiment as disclosed herein.

The system (1000) includes a communication management controller (100), memory (120), a processor (140) and a communicator (160). The communication management controller (100) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductors.

The memory (120) is configured to store instructions to be executed by the processor (140). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store large amounts of information. In certain examples, a non-transitory storage medium may store data that can, over time, change (e.g., in Random Access Memory (RAM) or cache).

The processor (140) communicates with the memory (120), the communicator (160) and the communication management controller (100). The processor (140) is configured to execute instructions stored in the memory (120) and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (160) includes an electronic circuit specific to a standard that enables wired or wireless communication. The communicator (160) is configured to communicate internally between internal hardware components of the system (1000) and with external devices via one or more networks.

In an embodiment, the communication management controller (100) can include for example but not limited to optical switch. The communication management controller (100) includes an input port (1), an active port (2), a control port (3) and a default port (4). The input port (1) is connected to the CU (5000) and the active port (2) is connected to the MH port of the first DU (2000). The control port (3) is connected to an alarm port of the first DU (2000) and the default port (4) is connected to a MH port of the second DU (3000). The communication management controller (100) provides two way communication between the first DU (2000) and the CU (5000).

The communication management controller (100) is configured to determine an alarm signal to the control port (3) of the communication management controller (100) is not set and hence determine a failure of the first DU (2000) based on the alarm signal to the control port (3) of the communication management controller (100) is not set. The failure of the first DU (2000) may be due to various reasons such as for example but not limited to latency, jitter, failure of the first DU (2000) completely, a failure in a communication link, a routine or ad hoc maintenance of the lead DU, or a time schedule criteria.

The communication management controller (100) is configured to automatically switch the input from the active port (2) to the default port (4) of the communication management controller (100) connected to the second DU (3000) and provide continuous service in the wireless communication network by redirecting traffic associated with the first DU (2000) towards the second DU (3000).

The communication management controller (100) is further configured to determine a priority associated with each of the bands to be served by the second DU (3000) and determine whether a capacity associated with the second DU (3000) meets a DU capacity threshold. The DU capacity threshold may be determined based on load handling capability of the DU such as for example but not limited to a number of users, an amount of data traffic, a number of radio units, etc. Further, the communication management controller (100) is configured to limit a cell capacity of the second DU (3000) to serve the LTE, the mmWave and the Sub6 simultaneously, on determining that the capacity associated with the second DU (3000) does not meet the DU capacity threshold. The communication management controller (100) is configured to shutdown the Sub6 NR to serve LTE on full capacity, on determining that the capacity associated with the second DU (3000) does meets the DU capacity threshold.

At least one of the plurality of modules/components of the communication management controller (180) may be implemented through an AI model. A function associated with the AI model may be performed through memory (120) and the processor (140). The one or a plurality of processors controls the processing of the input data in accordance with a predefined operating rule or the AI model stored in the non-volatile memory and the volatile memory. The predefined operating rule or artificial intelligence model is provided through training or learning.

Here, being provided through learning means that, by applying a learning process to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

Although the FIG. 2 shows various hardware components of the system (1000) but it is to be understood that other embodiments are not limited thereon. In other embodiments, the system (1000) may include less or more number of components. Further, the labels or names of the components are used only for illustrative purpose and does not limit the scope of the invention. One or more components can be combined together to perform same or substantially similar function using the system (1000).

Figure 3A:
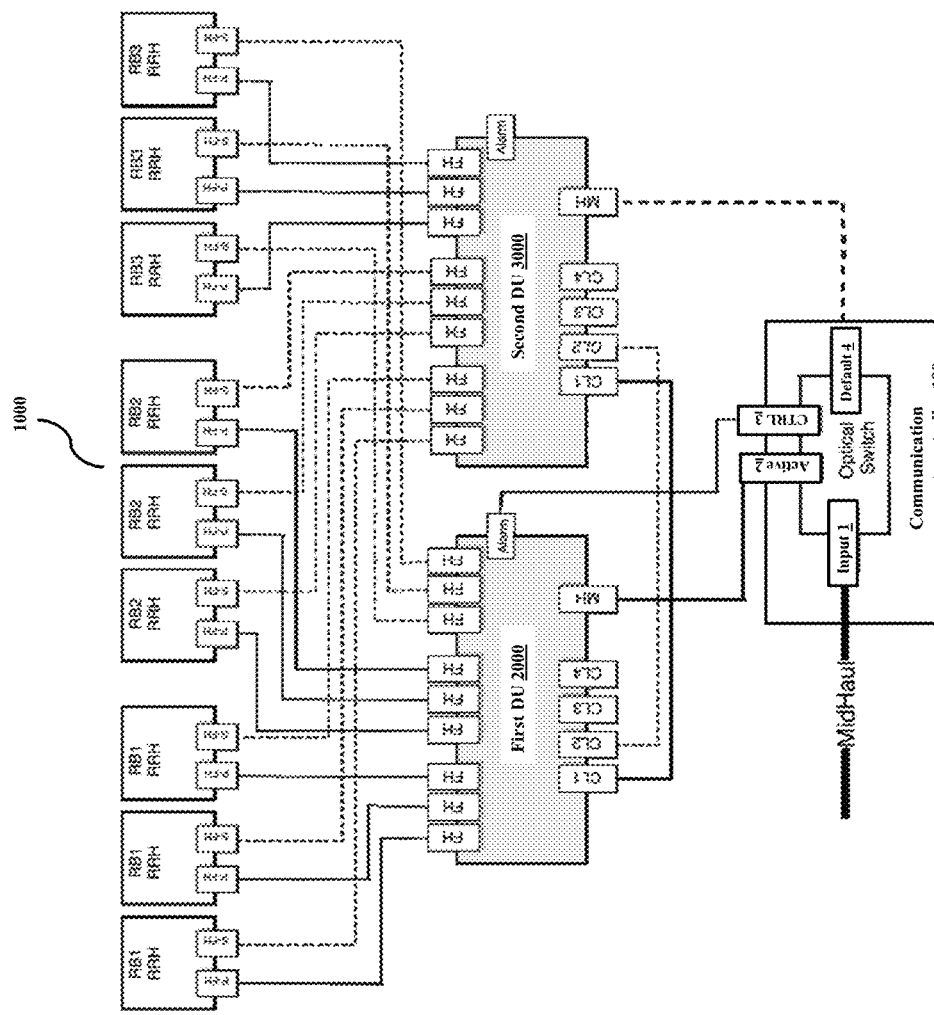
FIG. 3A illustrates a scenario of the cell site comprising two operating DUs connected to a communication management controller, according to an embodiment as disclosed herein.

FIG. 3A illustrates a scenario of the cell site comprising two operating DUs connected to the communication management controller (100), according to an embodiment as disclosed herein.

Referring to the FIG. 3A, the proposed method includes a complete redundant system with a passive optical switch. In the FIG. 3A, the system (1000) includes the first DU (2000) and the second DU (3000) at the cell site. The first DU (2000) is hosting LTE and mmWave and the second DU (3000) is hosting the Sub6 5G NR. The first DU (2000) connects to the communication management controller (100) towards the CU (5000). The second DU (3000) forwards the MH traffic to the first DU (2000) (via P-CL/S-CL link) and the first DU (2000) forwards the traffic to the CU (5000) through the communication management controller (100). Similarly, the traffic from the CU (5000) toward the second DU (3000) will be routed by the first DU (2000) to the second DU (3000) on the P-CL or the S-CL.

The first DU (2000) is the lead DU and the alarm signal to the control port (3) of the communication management controller (100) is set during the operation of the first DU (2000). The alarm being set is an indication of the operation of the first DU (2000). When the alarm signal is set then the MH traffic associated with the first DU (2000) is provided as the input to the active port (2) and through the input port (1) the first DU (2000) is connected to the CU (5000).

Though the proposed method is illustrated with respect to just two DUs or two nodes per site, the same logic can be extended to three or more sites as well.

Figure 3B:
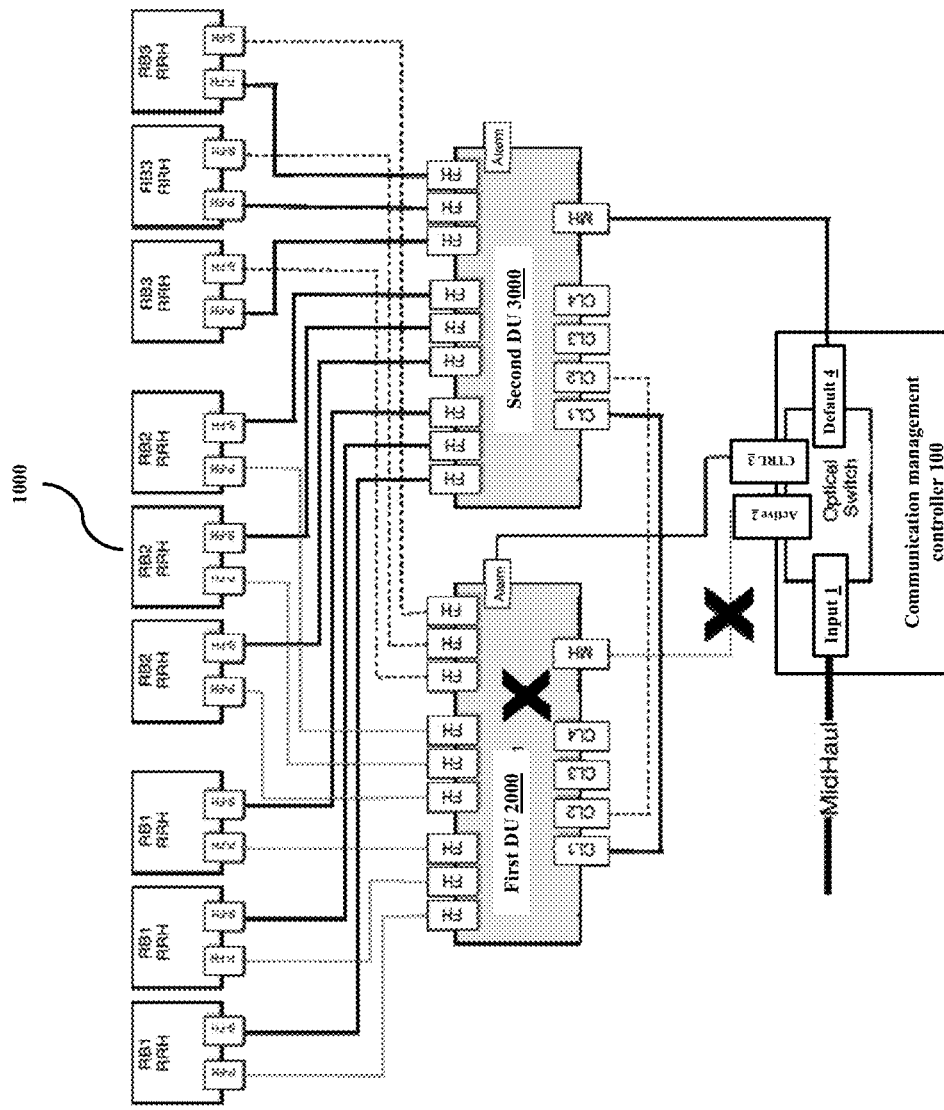
FIG. 3B illustrates a scenario of the cell site comprising a failed DU and an operating DU connected to the communication management controller, according to an embodiment as disclosed herein.

FIG. 3B illustrates a scenario of the cell site comprising the failed DU and the operating DU connected to the communication management controller (100), according to an embodiment as disclosed herein.

Referring to the FIG. 3B, consider a scenario that the first DU (2000) which is the lead DU has failed or the MH port of the first DU (2000) has failed. This will impact the services provided by the first DU (2000) to the subscribers.

The alarm signal to the control port (3) of the communication management controller (100) is not set during the failure of the first DU (2000). Also, the MH traffic associated with the first DU (2000) provided as the input to the active port (2) is disconnected. In the proposed scenario, the communication management controller (100) determines that the alarm is not set and moves the MH traffic associated with the first DU (2000) to the default Port (4). The default Port (4) is connected to the MH port of the second DU (3000) and hence the MH traffic from the MH port of the second DU (3000) is provided as the input to the default Port (4) which in turn communicates with the CU (5000).

As a result, the second DU (3000) assumes the role of the lead DU and takes over the workloads of the first DU (2000) (which includes both the LTE and the mmWave bands). The second DU (3000) may have to limit the cell capacity to serve all the bands which includes the LTE, the mmWave and the Sub6.

Further, the second DU (3000) may shutdown the Sub6 NR completely to serve the LTE on full capacity. Here, both the first DU (2000) and the second DU (3000) are connected to RRHs via Redundant links so in case one DU fails or one of link fails, other link will be used for providing the continuous communication. Also, there are Redundant cascade link between the first DU (2000) and the second DU (3000). Therefore, in case one of SFP or link (P-CL) fails, the first DU (2000) and the second DU (3000) continue to communicate over secondary link (S-CL).

Unlike to the conventional methods and systems, the proposed system (1000) is resilient to any form of failure/misbehaviour at the first DU (2000) or at the optical switch. When there is a failure misbehaviour detected at the first DU (2000) the path of the traffic is automatically diverted to the default path which leads to the second DU (3000). Even when there is failure of the optical switch as the whole the traffic from the midhaul is directly connected to the default Port (4) to ensure that the service is not curtailed.

Figure 3C:
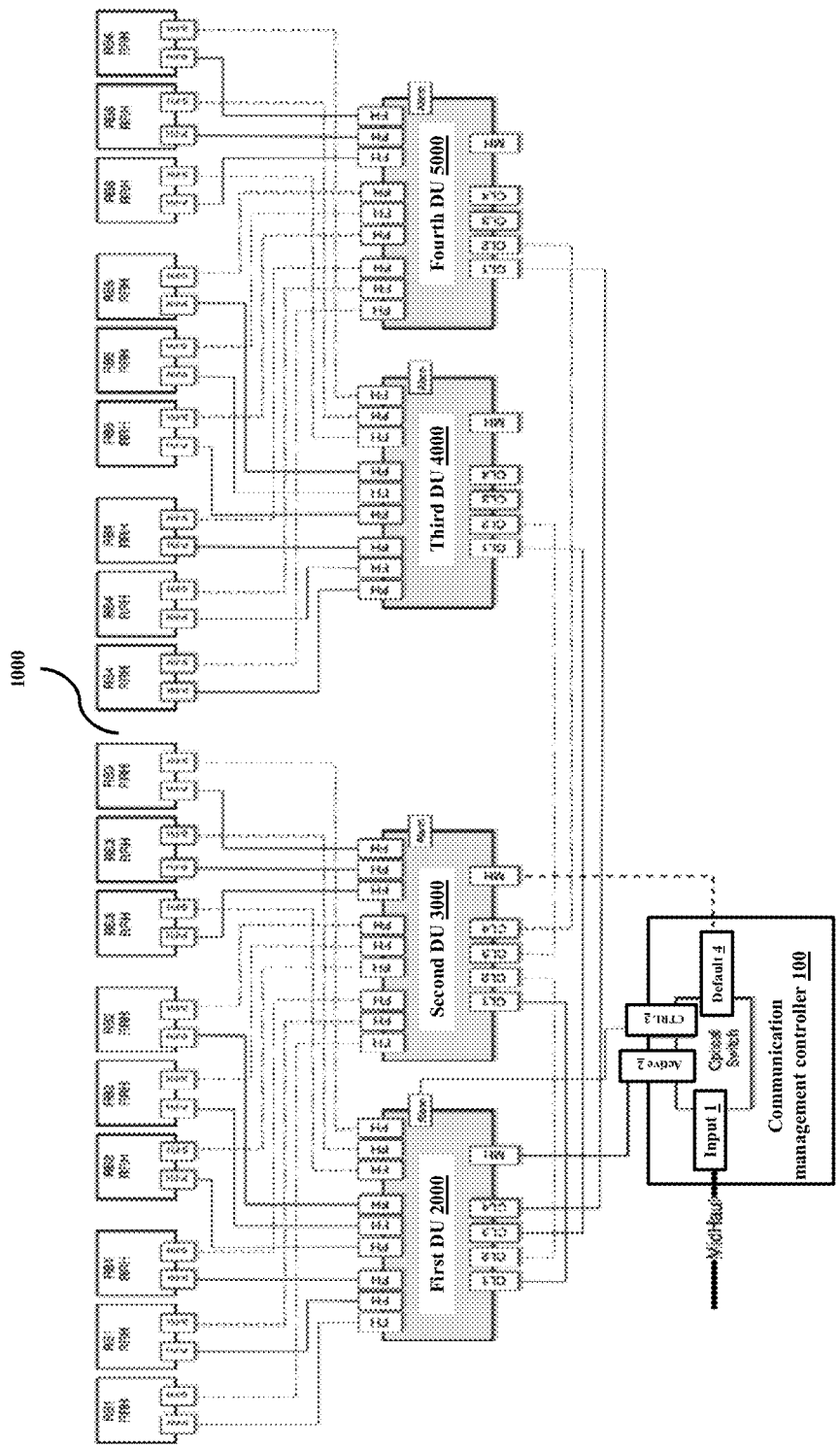

FIG. 3C illustrates a scenario traffic management at the cell site comprising multiple DUs and the failed DU, according to an embodiment as disclosed herein.

Referring to the FIG. 3C, consider that the second DU (3000), a third DU (4000) and a fourth DU (5000) are all connected to the first DU (2000) for communication with the Midhaul. The traffic from the CL1 and the CL2 of the second DU (3000) is connected to the CL1 and the CL2 of the first DU (2000). Therefore, during normal operation of both the first DU (2000) and the second DU (3000), the traffic from the second DU (3000) goes to the first DU (2000) and then through the MH port of the first DU (2000) connected to the active port (2) of the communication management controller (100) the traffic moves to and fro from the Midhaul. Similarly, the CL1 of the third DU (4000) is connected to the CL3 of the first DU (2000) and the CL2 of the third DU (4000) is connected to the CL3 of the second DU (3000). Therefore, the traffic from the third DU (4000) goes to the Midhaul through the first DU (2000). The same is applied to the fourth DU (5000).

Consider a scenario that the first DU (2000) fails due to any of the reasons such as for example power failure, port failure, mismanagement at the first DU (2000), etc. then the communication management controller (100) automatically shifts the traffic from the first DU (2000) to the second DU (3000) by diverting the traffic from the Midhaul towards the default port (4). As a result, the traffic from the third DU (4000) and the fourth DU (5000) are communicated with the Midhaul through the second DU (3000) now instead of the first DU (2000). Therefore, the cascading of the multiple DUs allows the traffic to be diverted towards the next active DU during the failure of the lead DU as a result never allowing the subscriber's service to be affected. Further, the proposed system (1000) handles all form of single point failure leading to the discontinuity of the service to the subscribers by making the system (1000) completely resilient.

In one scenario, consider that the first DU (2000) fails and the second DU (3000) is made the lead DU. Then, even though the first DU (2000) may be retrieved, the second DU (3000) will continue to operate as the lead DU with the radios of the first DU (2000) which are now shifted to the second DU (3000).

In another scenario, when the first DU (2000) is retrieved after the failure, the radios of the first DU (2000) are shifted back to the first DU (2000) from the second DU (3000) and the first DU (2000) will revert to the original position as the lead DU. In both the above scenarios, the first DU (2000) may be retrieved remotely using BMC of the first DU (2000).

In another scenario, when the second DU (3000) after being made the lead DU determines that the second DU (3000) may not be able to server all the bands then the second DU (3000) may shut down Sub6NR or mmWave or both to serve the LTE band.

Therefore, the proposed system (1000) involves the cascading of multiple DUs which makes the system (1000) resilient to any kind of failure.

Figure 4:
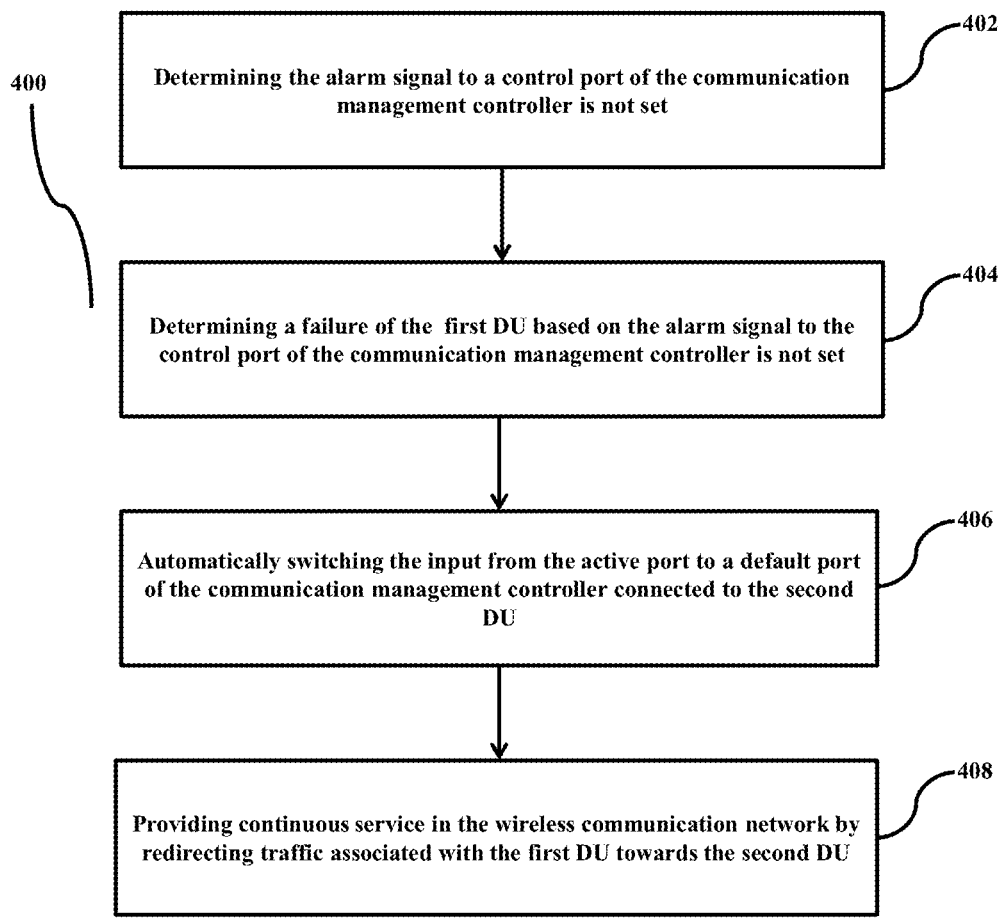
FIG. 4 is a flow diagram illustrating a method for providing continuous service in the wireless communication network, according to an embodiment as disclosed herein.

FIG. 4 is a flow diagram (400) illustrating a method for providing continuous service in the wireless communication network, according to an embodiment as disclosed herein.

Referring to the FIG. 4, at step 402, the method includes the communication management controller (100) determining the alarm signal to the control port of the communication management controller (100) is not set.

At step 404, the method includes the communication management controller (100) determining the failure of the first DU based on the alarm signal to the control port of the communication management controller is not set.

At step 406, the method includes the communication management controller (100) automatically switching the input from the active port to a default port of the communication management controller connected to the second DU.

At step 408, the method includes the communication management controller (100) providing continuous service in the wireless communication network by redirecting traffic associated with the first DU (1000) towards the second DU (2000).

The various actions, acts, blocks, steps, or the like in the flow diagram (400) may be performed in the order presented, in a different order or simultaneously. Further, in some embodiments, some of the actions, acts, blocks, steps, or the like may be omitted, added, modified, skipped, or the like without departing from the scope of the invention.

The advantages of the proposed method is service continuity which is a key business requirement. The proposed method ensures service continuity in the event of failure of one of the nodes. However in a traditional Redundant system where one node's capacity lies unused till the event of failure. This has cost in terms of CAPEX (initial deployment) and OPEX (running costs). The proposed method fully utilizes the installed nodes, and switches to the minimum service mode in case of failure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system for providing continuous service in a wireless communication network, wherein the system comprises:
  a communication management controller comprising a plurality of ports;
  a first distributed unit (DU) of a plurality of DUs connected to the communication management controller for communicating with a centralized unit (CU), wherein traffic associated with the first DU is provided as input to an active port of the communication management controller and the first DU is configured to set an alarm signal to a control port of the communication management controller indicating an active status of the first DU;
  at least one second DU of the plurality of DUs connected to the first DU; and
  wherein the communication management controller is configured to:
    determine the alarm signal to the control port of the communication management controller is not set,
    determine a failure of the first DU based on the alarm signal to the control port of the communication management controller is not set,
    automatically switch the input from the active port to a default port of the communication management controller, wherein the default port is connected to the at least one second DU, and provide continuous service in the wireless communication network by redirecting traffic associated with the first DU towards the at least one second DU.

2. The system as claimed in the claim 1, wherein the first DU is a lead DU and the first DU and the at least one second DU is hosting at least one band of a plurality of bands.

3. The system as claimed in the claim 1, wherein the at least one second DU forwards midhaul (MH) traffic to the first DU via at least one cascading link (CL) between the first DU and the at least one second DU, and the first DU forwards the MH traffic to the CU through the communication management controller and wherein the traffic from the CU towards the at least one second DU is routed by the first DU to the at least one second DU on the at least one CL between the first DU and the at least one second DU.

4. The system as claimed in the claim 1, wherein the at least one second DU acts as a lead DU on switching of the input from the active port to the default port of the communication management controller.

5. The system as claimed in the claim 1, wherein the at least one second DU is further configured to:
   determine a priority associated with each of the bands of the plurality of bands to be served by the at least one second DU, wherein the plurality of bands comprises LTE, mmWave and Sub6 5G NR;
   determine whether a capacity associated with the at least one second DU meets a DU capacity threshold;
   perform one of:
      limit a cell capacity of the second DU to serve the LTE, the mmWave and the Sub6 5G NR simultaneously, in response to determining that the capacity associated with the second DU does not meets the DU capacity threshold, and
      shutdown the Sub6 5G NR to serve the LTE on full capacity, in response to determining that the capacity associated with the at least one second DU does meets the DU capacity threshold.

6. A method for providing continuous service in a wireless communication network, wherein the method comprises:
   determining, by a communication management controller, an alarm signal to a control port of the communication management controller is not set, wherein the alarm signal to a control port of the communication management controller indicates an active status of a first distributed unit (DU) of a plurality of DUs;
   determining, by the communication management controller, a failure of the first DU based on the alarm signal to the control port of the communication management controller is not set, wherein traffic associated with the first DU is provided as input to an active port of the communication management controller;
   automatically switching, by the communication management controller, the input from the active port to a default port of the communication management controller, wherein the default port is connected to at least one second DU; and
   providing, by the communication management controller, continuous service in the wireless communication network by redirecting traffic associated with the first DU towards the at least one second DU.

7. The method as claimed in the claim 6, wherein the communication management controller comprises a plurality of ports and the first DU is connected to the communication management controller for communicating with a centralized unit (CU).

8. The method as claimed in the claim 6, wherein the first DU is a lead DU and the first DU and the at least one second DU is hosting at least one band of a plurality of bands.

9. The method as claimed in the claim 6, wherein the at least one second DU forwards midhaul (MH) traffic to the first DU via at least one cascading link (CL) between the first DU and the at least one second DU, and the first DU forwards the MH traffic to the CU through the communication management controller and wherein the traffic from the CU towards the at least one second DU is routed by the first DU to the at least one second DU on the at least one CL between the first DU and the at least one second DU.

10. The method as claimed in the claim 6, wherein the at least one second DU acts as a lead DU on switching of the input from the active port to the default port of the communication management controller.

11. The method as claimed in the claim 6, further comprises:
   determining, by the at least one second DU, a priority associated with each of the bands of the plurality of bands to be served by the at least one second DU, one second DU, wherein the plurality of bands comprises LTE, mmWave and Sub6 5G NR;
   determining, by the at least one second DU, whether a capacity associated with the at least one second DU meets a DU capacity threshold;
   performing, by the at least one second DU, one of:
      limiting a cell capacity of the second DU to serve the LTE, the mmWave and the Sub6 5G NR simultaneously, in response to determining that the capacity associated with the second DU does not meets the DU capacity threshold, and
      shutting down the Sub6 5G NR to serve the LTE on full capacity, in response to determining that the capacity associated with the second DU does meets the DU capacity threshold.

* * * * *